June 11, 1929.  F. C. MORRIS  1,716,499
ANTIRATTLING BEARING BUSHING
Filed April 28, 1924
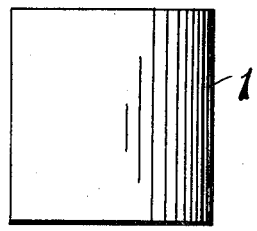
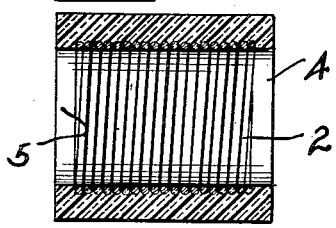
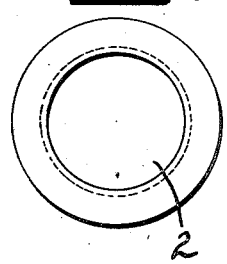
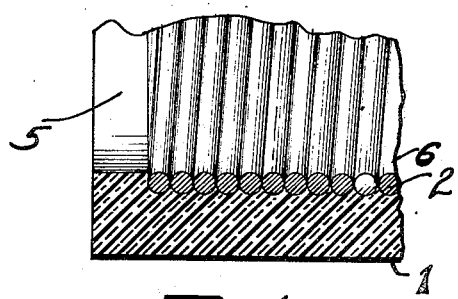
INVENTOR.
Fred C. Morris.
BY
Carlos P. Griffin
ATTORNEY.

Patented June 11, 1929.

1,716,499

UNITED STATES PATENT OFFICE.

FRED C. MORRIS, OF SAN FRANCISCO, CALIFORNIA.

ANTIRATTLING BEARING BUSHING.

Application filed April 28, 1924. Serial No. 709,338.

This invention relates to an anti-rattling bearing bushing, an object of which is to provide means whereby shafts which do not have much turning to do can be adequately and firmly supported without rattling.

Another object of the invention is to provide means whereby a shaft can be supported in a bearing bushing of the character shown herein by having solid graphite forced into the interstices between the metal which makes up the lining of the bushing. This bushing is especially used in connection with certain shafts on automobiles where there is not much motion, but where there is a great deal of rattling unless the shaft is tightly held in the desired position.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of the complete bushing,

Fig. 2 is a longitudinal sectional view of the bushing,

Fig. 3 is an end view of the complete bushing, and

Fig. 4 is a sectional view of the bushing on a larger scale to illustrate the manner of packing the interstices between the wires with lubricant.

The bushing consists of a body of rubber 1 made of a suitable light resistant composition, vulcanized over a tightly wound coil of bronze or other bearing metal wire 2. The coil 2 is wound with its several turns closely adjacent one another, and it is made of the desired length and diameter to support the shaft. The coil of wire is then placed in a mold in such a way as to produce a rubber covering with rubber at the ends of the coil, as indicated at 4 and 5. It will be seen that this coil of wire gives an increased holding surface with respect to the rubber over a plain tube, and since it is formed on the inside, which bears on the shaft of a series of coils, the space between the coils is filled with hard graphite, which is a lubricant for the shaft. These bodies of graphite are inserted between each of the coils, as indicated at 6, in Fig. 4, and since the wires come in contact with the shaft, the graphite remains in the bearing for a long period, always acting as a lubricant.

In use the bearing can be forced tightly into a metal tube or any other structure where it is to be secured, and will properly support the shaft, the rubber preventing any noise from rattling.

What I claim is as follows, but modifications may be made in carrying out the invention shown in the drawings and in the above particularly described form thereof, within the purview of the invention as defined by the annexed claim:

An anti-rattling bearing bushing comprising a closely wound coil of round wire imbedded in a resilient material, resilient material at each end and having the spiral space formed by said round wire coil filled with graphite.

In testimony whereof I have hereunto set my hand this 17th day of April, A. D. 1924.

FRED C. MORRIS.